(12) United States Patent
Loewen et al.

(10) Patent No.: US 9,302,226 B2
(45) Date of Patent: Apr. 5, 2016

(54) SALT FILTRATION SYSTEM AND METHOD OF REMOVING A RADIOACTIVE MATERIAL FROM A GAS USING THE SAME

(71) Applicants: Eric Paul Loewen, Wilmington, NC (US); Pradip Saha, Wilmington, NC (US); Emma Lebwohl, Wilmington, NC (US); Kelly Ann Fitzwater, Wilmington, NC (US)

(72) Inventors: Eric Paul Loewen, Wilmington, NC (US); Pradip Saha, Wilmington, NC (US); Emma Lebwohl, Wilmington, NC (US); Kelly Ann Fitzwater, Wilmington, NC (US)

(73) Assignee: GE-HITACHI NUCLEAR ENERGY AMERICAS LLC, Wilmington, NC (US)

( * ) Notice: Subject to any disclaimer, the term of this patent is extended or adjusted under 35 U.S.C. 154(b) by 0 days.

(21) Appl. No.: 14/269,505

(22) Filed: May 5, 2014

(65) Prior Publication Data

US 2015/0314240 A1 Nov. 5, 2015

(51) Int. Cl.
*B01D 53/02* (2006.01)
*B01D 59/50* (2006.01)
*B01D 53/14* (2006.01)
*B01D 53/22* (2006.01)
*G21F 9/02* (2006.01)
*G21F 9/04* (2006.01)

(52) U.S. Cl.
CPC .......... *B01D 59/50* (2013.01); *B01D 53/1406* (2013.01); *B01D 53/229* (2013.01); *G21F 9/02* (2013.01); *G21F 9/04* (2013.01); *B01D 2053/221* (2013.01); *B01D 2252/10* (2013.01)

(58) Field of Classification Search
CPC ................ B01D 2251/304; B01D 2251/306; B01D 2251/404; B01D 2251/604; B01D 2257/204; B01D 53/685; G21F 9/02
See application file for complete search history.

(56) References Cited

U.S. PATENT DOCUMENTS

| | | |
|---|---|---|
| 3,338,665 A | 8/1967 | Silverman |
| 3,890,233 A | 6/1975 | Gischel |
| 4,000,993 A | 1/1977 | Holl |
| 4,133,651 A | 1/1979 | Hoy et al. |
| 4,163,649 A | 8/1979 | Calvert |
| 4,266,951 A | 5/1981 | Calvert |
| 4,345,916 A | 8/1982 | Richards et al. |
| 4,544,379 A | 10/1985 | Elliott et al. |

(Continued)

FOREIGN PATENT DOCUMENTS

| | | |
|---|---|---|
| DE | 2654436 A1 | 6/1977 |
| FR | 2390197 A1 | 12/1978 |
| GB | 1004183 A | 9/1965 |

OTHER PUBLICATIONS

European Search Report and Opinion issued in connection with corresponding EP Application No. 15166125.3 on Sep. 28, 2015.

*Primary Examiner* — Christopher P Jones
(74) *Attorney, Agent, or Firm* — Harness, Dickey & Pierce, P.L.C.

(57) ABSTRACT

A method of removing a radioactive material from a gas includes directing the gas through a bed of salt, wherein the gas includes water vapor and the radioactive material. The salt constitutes more than 50 percent by weight of the bed. The method additionally includes condensing the water vapor in the bed and dissolving a portion of the salt to form a salt solution. The method further includes absorbing the radioactive material into the salt solution while a remainder of the gas passes through the bed. A salt filtration system configured to perform the method may be implemented as a pre-filter (or post-filter) to an existing filter unit or as a standalone filter.

9 Claims, 2 Drawing Sheets

(56) References Cited

U.S. PATENT DOCUMENTS

| | | |
|---|---|---|
| 5,171,519 A | 12/1992 | Corpora et al. |
| 5,814,118 A | 9/1998 | Wickland et al. |
| 6,344,071 B1 | 2/2002 | Smith et al. |
| 7,267,805 B2 | 9/2007 | Bruck et al. |
| 2010/0126349 A1 | 5/2010 | Vermeulen |
| 2012/0111200 A1 | 5/2012 | Gauthier et al. |
| 2013/0323149 A1* | 12/2013 | Yeon et al. .............. 423/241 |

* cited by examiner

SALT FILTRATION SYSTEM AND METHOD OF REMOVING A RADIOACTIVE MATERIAL FROM A GAS USING THE SAME

BACKGROUND

1. Field

The present disclosure relates to filtration systems and methods of containment venting during off-normal events at a nuclear power plant.

2. Description of Related Art

During an off-normal event (e.g., severe accident) at a nuclear power plant, gases are released into the containment from the reactor core. Conventional responses to the off-normal event include unfiltered and filtered approaches. With a conventional unfiltered approach, the radioactive discharge from the nuclear power plant containment merely passes through a valve of a hardened vent before being vented to the environment. On the other hand, with a conventional filtered approach, venting of the containment occurs by opening a valve to permit the gas flow to enter a filtered vent. The filtered vent may be a wet filtered vent or a dry filtered vent which is intended to remove radioactive materials from the vented gas stream before releasing the vented gas stream into the environment.

BRIEF DESCRIPTION OF EXAMPLE EMBODIMENTS

A method of removing a radioactive material from a gas includes directing the gas through a bed of salt, wherein the gas includes water vapor and the radioactive material. The salt constitutes more than 50 percent by weight of the bed. The method additionally includes condensing the water vapor in the bed and dissolving a portion of the salt to form a salt solution. The method further includes absorbing the radioactive material into the salt solution while a remainder of the gas passes through the bed.

A salt filtration system includes a module body defining a chamber therein. The module body includes an inlet to the chamber and an outlet therefrom. The system additionally includes a porous membrane within the module body. The porous membrane is between the inlet and the outlet of the module body. The porous membrane divides the chamber into an upper section and a lower section. The system further includes a bed of salt supported by the porous membrane so as to be within the upper section of the chamber. The salt constitutes more than 50 percent by weight of the bed.

BRIEF DESCRIPTION OF THE DRAWINGS

The various features and advantages of the non-limiting embodiments herein may become more apparent upon review of the detailed description in conjunction with the accompanying drawings. The accompanying drawings are merely provided for illustrative purposes and should not be interpreted to limit the scope of the claims. The accompanying drawings are not to be considered as drawn to scale unless explicitly noted. For purposes of clarity, various dimensions of the drawings may have been exaggerated.

DETAILED DESCRIPTION OF EXAMPLE EMBODIMENTS

Figure 1:
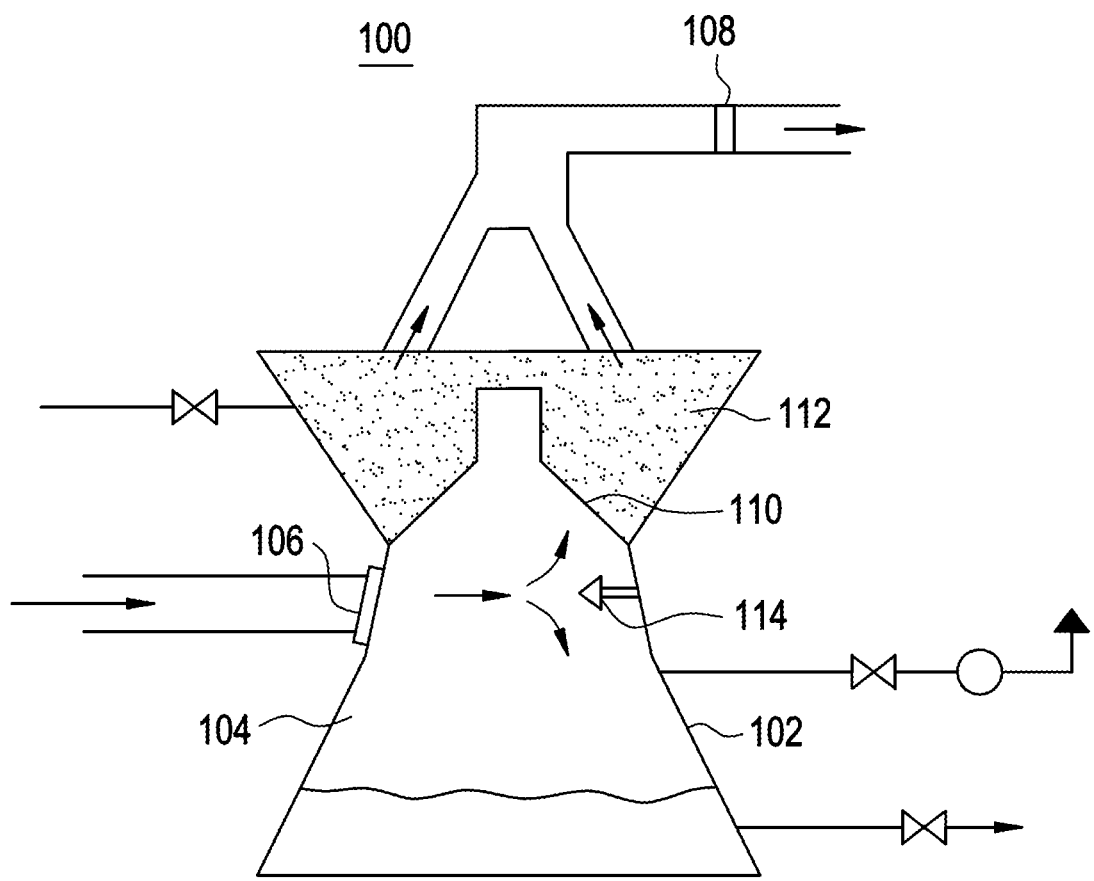
FIG. 1 is a schematic view of a salt filtration system according to an example embodiment of the present disclosure.

It should be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It should be understood that, although the terms first, second, third, etc. may be used herein to describe various elements, components, regions, layers and/or sections, these elements, components, regions, layers, and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of example embodiments.

Spatially relative terms (e.g., "beneath," "below," "lower," "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various embodiments only and is not intended to be limiting of example embodiments. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

The present disclosure pertains to a system and method of removing the high heating radioactive materials discharged from a nuclear power plant during an off-normal event. The present system can be applied to any commercial nuclear power plant as a hardened vent or located upstream of an existing system to improve performance. The present approach uses a combination of ionic reactions, dewatering, in situ heat removal, and particulate trapping to increase the removal of radionuclides from the radioactive vented gas stream, serving as both a dry or wet well venting system.

Figure 2:
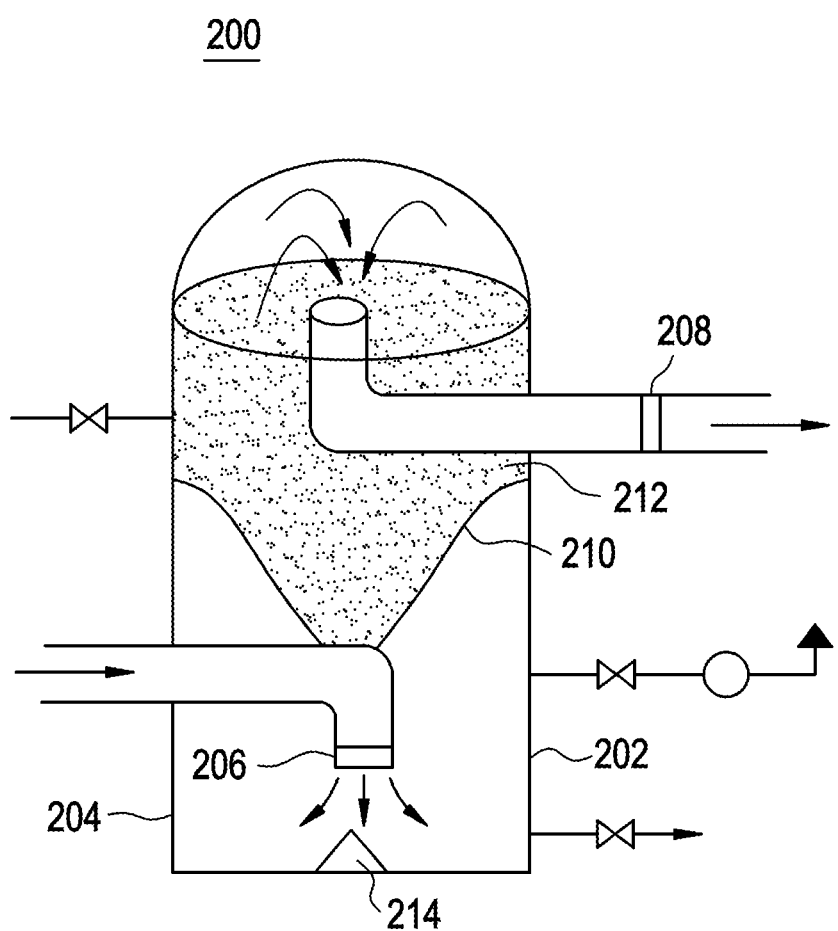
FIG. 2 is a schematic view of a salt filtration system according to another example embodiment of the present disclosure.

FIG. 1 is a schematic view of a salt filtration system according to an example embodiment of the present disclosure. FIG. 2 is a schematic view of a salt filtration system according to another example embodiment of the present disclosure. The specifics of FIGS. 1-2 will be discussed in a later portion of the detailed description.

The present system and method target the two most radioactive materials released during venting: cesium and iodine, although example embodiments are not limited thereto. Generally, cesium and iodine are released from the primary containment during venting or depressurizing sequences. Conventionally, the installed standard was a wet venturi scrubbing system. This conventional approach, although workable and in use at over 50 nuclear power plants, is costly. As a result, the present system can be used as a standalone system in lieu of a conventional system. Alternatively, the performance of a conventional system can be improved and the cost to install can be reduced if the present system is added as a pre-filter and/or a post-filter. The present system is versatile in that it can conform to the space limitations within the nuclear power plant containment, reactor building, or yard.

The present approach applies the physical laws of chemical attractions, solution formation, and fluid drag to better capture targeted chemical elements/compounds (e.g., cesium and iodine). For example, the deposition of cesium and iodine, the dewatering of the vented gas stream, and the removal of decay heat improves the effectiveness of severe accident containment venting systems.

The present disclosure relates to a method of radioactive material capture (e.g., specifically targeting cesium and iodine) to mitigate radioactive release beyond the licensed site boundary and to remove decay heat from the filtration system. The present filtering system is a shapeless filter meaning it can conform to the available space and still meet performance requirements. For example, in BWR Mark I or Mark II containments, the system can be located inside the dry or wet well, or in another available space at the plant site. The dry bed media (salt) is engineered to capture radioactive elements/compounds (e.g., iodine). The conventional way of capturing iodine is with a charcoal filter, which needs a dry and cooled steam input. However, such a conventional approach is problematic. The present approach overcomes this limitation. This system accounts for the water, removes the water, and utilizes it for reinjection to keep the reactor core sub-critical and cool. It can be a standalone filter capable of filtering very hot, water-laden vent gas.

Various terms of art are used in the present disclosure. Such terms should be interpreted in the context of nuclear engineering, particularly nuclear power generation. Definitions of some of the terms are provided below for added clarity.

Time-dependent activity is expressed as $A(t)=A_0 e^{-\lambda t}$, wherein t is the holdup time, and $\lambda$ is the nominal aggregated decay constant. However, it should be noted that the activity can be replaced in this equation by any number of quantities, including the gamma dose rate or the heat rate.

Pressure drop, represented by the following equation, $\Delta p = K_L \frac{1}{2} \rho V^2$, is highly dependent on the geometry and fluid properties of the system. The density and average velocity of the fluid is represented by $\rho$ and V, respectively. The loss coefficient is represented by $K_L$, which is strongly dependent on geometry and somewhat dependent on fluid properties. Geometry effects are mainly concerned with roughness of the material contacting the fluid, the flow area, flow length, and flow path.

Gas pressure drop in a packed bed can be described with the Ergun Equation as pressure drop per length:

$$\frac{\Delta P}{L} = \frac{150\mu(1-\epsilon)^2 u_o}{\epsilon^3 d_p^2} + \frac{1.75(1-\epsilon)\rho u_o^2}{\epsilon^3 d_p},$$

wherein $\mu$ is the fluid viscosity, $\epsilon$ is the void space of the bed, $u_o$ is the fluid superficial velocity, $d_p$ is the particle diameter, $\rho$ is the density of the fluid. L, the height of the bed, and $\epsilon$, the void space of the bed, are both functions of the dissolution with time.

Gravitational settling is the process by which a particle in an airstream is pulled downward by gravity until it strikes a stationary obstacle (e.g., surface in the dry media) and is removed from the gas stream.

Diffusion is the process by which the molecules of two or more substances (very small particles having some molecular characteristics) mix as a result of random thermal motion within the capture media, and adsorb onto the surface and are thus removed from the vented gas stream.

Behavior of aerosols in a gas stream is a function of size, specific gravity, shape, and surface properties governing the ability to capture radioactive aerosols from a gas stream. During a severe accident, core damage, or large contamination event, it is very difficult to predict these variables. Therefore, the present approach utilizes a tailored salt bed, which is designed for the selected removal of fission products.

With regard to polar and non-polar molecules, a polar molecule has a distorted electronic cloud surrounding the molecule due to one atom having a higher electronegative (affinity) for electrons. The most common example of a polar molecule is water. On the other hand, a non-polar molecule does not have a large distortion in the electronic configuration of the molecule, because the electronegativities are similar and there is more electron sharing in covalent bonds. Within the radioactive vented gas stream, there are both polar and non-polar radioactive species. A governing principle of solution chemistry is "like dissolves like." Therefore, to capture polar molecules, the use of a polar molecule (e.g., water) works. Likewise, the capture of a non-polar compound requires a non-polar compound. The present disclosure will discuss herein how different filtration units can capture polar (e.g., organic) radioactive species.

Decontamination factor (DF) is a dimensionless ratio. The ratio is the amount of contaminant that enters a filtration system divided by the amount that leaves the system. A DF can be measured over a modular filtration section or on a particular radionuclide of interest (e.g., iodine). For example, the performance of the present approach may be such that DF>1,000 for aerosols (including submicron), and DF>100 for elemental Iodine.

A fission product is an atomic fragment left after a fission event. In particular, a fission reaction is described by the following equation, $_{92}^{235}U + _0^1n \rightarrow F_1 + F_2 + _0^0\gamma's + _0^1n's$. After a fission event, the original nucleus splits into two smaller nuclei, releasing a few neutrons and gamma rays. The two smaller nuclei (represented by & $F_1$ & $F_2$) remaining after the fission event are known as fission products. Since the fission process follows a probabilistic process, these fission products will differ in each reaction and some products will continue to undergo radioactive decay into other isotopes.

Fission products available for release are products of concern in the event of a severe nuclear accident involving a partial or complete meltdown. Table 1 lists aerosol materials of principal interest that are available for release including the fission products of most concern to the public.

TABLE 1

Aerosol Materials of Principal Interest

| Compound | Density (g/cm³) | Molecular Weight |
|---|---|---|
| Fission Products | | |
| BaO | 5.72 | 153.33 |
| $CdI_2$ | 5.64 | 366.22 |
| $Ce_2O_3$ | 6.86 | 328.24 |
| $CsBO_2$ | 3.7 | 175.72 |
| CsI | 4.51 | 259.81 |
| CsOH | 3.68 | 149.91 |
| $Cs_2MoO_4$ | 4.3 | 335.76 |
| $La_2O_3$ | 6.51 | 325.81 |
| $MoO_2$ | 6.47 | 127.94 |
| SrO | 4.7 | 103.62 |
| SnTe | 6.5 | 246.31 |
| Control Materials | | |
| Ag | 10.50 | 107.87 |
| $B_2O_3$ | 2.55 | 69.62 |
| Cd | 8.65 | 112.41 |
| $In_2O_3$ | 7.18 | 277.63 |
| Structural Materials | | |
| FeO | 6.0 | 71.84 |
| MnO | 5.37 | 70.94 |
| Ni | 8.90 | 58.69 |
| $SnO_2$ | 6.85 | 150.71 |
| $ZrO_2$ | 5.89 | 123.22 |
| Fuel Materials | | |
| $UO_2$ (3% $^{235}U$) | 10.96 | 237.9 |
| $PuO_2$ | 11.46 | 271.05 |

Table 2 lists PWR core inventory fractions released into the containment that are available for release.

TABLE 2

PWR Core Inventory Fraction Released into Containment

| Chemical Group | Gap Release Phase | Early In-Vessel Phase | Total |
|---|---|---|---|
| Noble gases | 0.05 | 0.95 | 1.0 |
| Halogens | 0.05 | 0.35 | 0.4 |
| Alkali metals | 0.05 | 0.25 | 0.3 |
| Tellurium metals | 0.00 | 0.05 | 0.05 |
| Barium, strontium | 0.00 | 0.02 | 0.02 |
| Noble metals | 0.00 | 0.0025 | 0.0025 |
| Cerium group | 0.00 | 0.0005 | 0.0005 |
| Lanthanides | 0.00 | 0.0002 | 0.0002 |

Table 3 lists BWR core inventory fractions released into the containment that are available for release.

TABLE 3

BWR Core Inventory Fraction Released into Containment

| Chemical Group | Gap Release Phase | Early In-Vessel Phase | Total |
|---|---|---|---|
| Noble gases | 0.05 | 0.95 | 1.0 |
| Halogens | 0.05 | 0.25 | 0.3 |
| Alkali metals | 0.05 | 0.20 | 0.25 |
| Tellurium metals | 0.00 | 0.05 | 0.05 |
| Barium, strontium | 0.00 | 0.02 | 0.02 |
| Noble metals | 0.00 | 0.0025 | 0.0025 |
| Cerium group | 0.00 | 0.0005 | 0.0005 |
| Lanthanides | 0.00 | 0.0002 | 0.0002 |

The maximum radioactivity is determined by the mass of fission products and fuel material released from the containment. Due to the process of radioactive decay, the amount of total radioactivity decreases within the first few days of the accident. Thus, the benefit of a modified hardened vent piping is that it is outside the reactor building/containment building, thereby reducing the dose to workers in the recovery efforts. The unique fission products from a typical LWR system number over 700, all with different decay constants and concentrations. Thus, the design of the present system uses an aggregated decay constant. This can be calculated using the data presented in NRC Regulatory Guide 3.54 Rev 1: "Spent Fuel Heat Generation in an Independent Spent Fuel Storage Installation" for long periods of time. The goal is to prevent the release of radioactive material at event initiation, as this is when the dose potential is the highest.

Decay heat is the heat released as a result of radioactive decay. Table 4 lists the top ten heat producing fission products that would be present inside a nuclear power plant fuel (at Burnup=41.2 GWD/MT in a PWR) containment in the event of fuel damage and leakage from the primary coolant system. The capture of, for instance, cesium (Cs) and iodine (I) will mitigate the removal of decay heat within the subsequent filtered vent system.

TABLE 4

| Radioisotope | Heat Output at Shutdown (W) |
|---|---|
| I 134 | 4.27E+04 |
| Cs 138 | 3.83E+04 |
| Cs 140 | 3.72E+04 |
| Nb 102 | 3.45E+04 |
| Y 96 | 3.37E+04 |
| La 142 | 3.29E+04 |
| Tc 104 | 3.23E+04 |
| La 144 | 2.61E+04 |
| Y 98 | 2.57E+04 |
| La 140 | 2.50E+04 |

The removal of radioactive elements, such as cesium and iodine, from a large gas flow when venting the containment during a severe accident is relatively difficult. The present approach is useful in that it removes radioactivity from high temperature wet vent gas, novel in that it uses consumable neutron-absorbing salts, and nonobvious in that the industry standard is a wet venturi system. The present system is also more cost-effective for nuclear power plants to install than conventional systems.

The venting of a nuclear containment under the conditions of a severe accident accumulates a complicated mixture of condensable and non-condensable gases, particulates, reactive chemical aerosols, and water/steam. The radioactive constituents in the vented gas can move diffusely, rather than with the macroscopic movement of the gas. Thus, understanding of the transport phenomena of the radioactive materials and disrupting the flow via chemical dissolution reactions provides a better method for removal of radioactive elements such as cesium and iodine.

A small radioactive particle suspended or flowing in a gas where a temperature gradient exists can move differently from one in a gas where a temperature gradient does not exist. This difference is attributed to the fact that radioactive particles will move from regions of high to low temperature. Passing the vented gas flow through a mixed bed of salt will result in the phenomenon of salt dissolution due to the entrained water/steam, dissolution of the salt resulting in lowering of the apparent temperature, and polar attraction of the polar radioactive species.

The dissolution of the salt is also a function of the temperature of the vented gas. One of the innovative features of the present approach is to select a salt with a wide range of solubility such that, with a high temperature vented gas, more salt is dissolved, resulting in a larger temperature gradient and better capture of radioactive elements such as cesium and iodine. In a non-limiting embodiment, sodium pentaborate salts mixed with salts of cesium and iodine are utilized. This salt filtration approach is beneficial in situations where the containment is vented at saturated conditions at more than the design pressure. The solution of water, salt, and radionuclides, as it cools, becomes saturated and further cooling will result in the precipitation of salts, further reducing the potential spread of radioactive material.

If venting occurs with a low temperature bulk gas (e.g., venting early in a severe accident in accordance with Severe Accident Guidelines) to reduce containment pressure, less salt is dissolved which allows the salt bed to be available if containment conditions degrade (i.e., increased temperature, with increased water and radionuclide content). Thus, the usefulness of the present approach is that it will work with early, late, or high pressure venting.

The use of sodium pentaborate, $Na_2B_{10}O_{16}\cdot10H_2O$, is disclosed herein in connection with the present salt filtration approach. The dissolution of sodium pentaborate involves an endothermic chemical reaction, which can be described by the following equation for the solution cycle for ionic compounds in water: $\Delta H_{soln} = U + \Delta H_{hydr}$, wherein $\Delta H_{soln}$ is the heat of solution or the heat transferred when a certain amount of a solute dissolves in a certain amount of a solvent, U is the lattice energy or the amount of energy required to separate a mole of ions in an ionic compound, and $\Delta H_{hydr}$ is the heat of hydration of the amount of energy released when a mole of ions bond with water molecules. The value of $\Delta H_{soln}$ is positive for the reaction of sodium pentaborate with water, thus indicating that the reaction is endothermic and that heat will be absorbed from the hot vented gas. The lattice energy term is much larger than the heat of hydration term, and this increase in entropy outweighs the increase in enthalpy, thereby allowing salt to dissolve. When endothermic reactions absorb energy, a temperature drop is measured during the reaction. The temperature of precipitation will occur at a lower temperature than the solubility temperature.

As previously noted, cesium and iodide salts may be mixed with the sodium pentaborate to enhance the selective capture of cesium and iodine released from the primary containment. The released particles will be captured via polar bonding and dissolution in the water. For example, a composition of 80% sodium pentaborate and 20% of cesium chloride (CsCl) and sodium iodide (NaI) may be used. Both salts are very soluble in water. At 25° C., the solubility of CsCl is 191.04 g CsCl/100 g $H_2O$, and the solubility of NaI is 184 g NaI/100 g $H_2O$. Following the general chemistry principle that "like dissolves like," the salts are ionic and polar, and water is also polar, so water dissolves the salt. The salt ions in the water will subsequently capture the radioactive materials released from the primary containment.

In the event of a long term station blackout with containment failure, the release to environment (e.g., based on percentage of initial core inventory given by the State-of-the-Art Reactor Consequence Analysis (SOARCA) case at Peach Bottom (BWR 4/Mark I)) may be 2% of Iodine in the form of CsI, 0.5% Cesium, the vast majority of which is transported in the form of cesium molybdate ($CS_2MoO_4$), 2.2% Tellurium and 0.1% Cerium (a heavy non-volatile species). The present system is designed so that cesium molybdate is captured physically in the bed.

Current concerns of the NRC include managing the cost/benefits based on the likelihood of a severe accident not already mitigated by current safety systems in place and mandated based on recent events. An additional desire is that such safety systems act over a wider set of conditions. The present disclosure is directed to a filter with additional benefits that would serve multiple purposes based on the type of accident that may occur. In particular, the present approach serves to increase the reliability of a vent system to relieve pressure in the event of a severe accident and minimize the release from said vent. The present approach can provide venting of a containment without the release of radioactive material to the environment while still providing needed relief to containment. The present system could, therefore, be used in less severe accidents where full venting might not yet be required. This would ease the potential concern of operators who would be required to take action and may be concerned with releasing radioactive material to the environment.

The present system is also robust to hydrogen detonation/deflagration, since the salt bed can absorb some of energy release and still function (for example, High-efficiency particulate absorption (HEPA) filtration, which uses paper media, would rupture). Debris from MCCI (molten core concrete interaction) entrained in the gas stream would be physically captured in the salt bed. Additionally, the water captured in the present filter can subsequently be used for flooding the containment to prevent failure and suppress criticality from MCCI.

A major concern with mitigating a severe accident is the amount of water that is able to be injected into the containment. Water is used to cool the core and to provide a means to scrub the radioactive particles being released from the core. The additional water is mostly helpful with scrubbing particles of 0.3 microns or larger. Specifically, borated water, a neutron poison, adds the additional benefit of reducing the likelihood of re-criticality (as was a concern with the severe accident at Fukushima).

It is an objective of the present approach to provide a method of placing radioactivity that has been released from the reactor fuel, into the coolant, and then into the containment gas into a pre-salt bath to increase the filtered vent decontamination factor (DF). In this manner, the filtered capture system will increase its performance and decrease its cost of installation since this filter will reduce the "engineering burden" of the conventional art since the large heat generators and water are removed in bulk. The present system is self-regulating based on the temperature of the vented gas, requires no power to operate, and serves as another source of borated water that could be injected into the reactor core. The present approach uses the physical property of dewatering the gas, cooling the gas, and the retention of cesium and iodine salts/radionuclides.

As previously noted, the present system may be used as a pre-filter (and/or post-filter) utilizing salt filtration to assist an existing filter. Alternatively, the present system may be used as a standalone salt filter in lieu of an existing filter. The standalone salt filter may include one salt filter or several serially connected salt filters. The pre-filter may be added to the filtered vent system between the containment (downstream of the vent valve(s)) and the existing or planned filter. The post-filter may be installed downstream from the existing or planned filter. The salt pre-filter is designed to remove fission products (e.g., cesium and iodine) while dewatering the vented gas before being filtered a second time by the existing or planned filter. Additionally, a salt post-filter may be used to perform a secondary (or subsequent) filtration following an initial filtration by the existing or planned filter. Assuming that the decontamination factor (DF) of the pre-filter (or post-filter) is Z and the DF of the existing or planned filter is X or Y, then the overall DF for the combination is the product of the individual DFs, i.e., $Z*X$ or $Z*Y$. The DF is improved by removing the water and bulk cesium and iodine as the gas spends (residence) time within the salt media. The pre-filtered gas is then conveyed to a standard venting system. On the other hand, the gas from a standard filter may be conveyed to a post-filter.

One aspect of the present system relates to deposition. In a non-limiting embodiment, the radioactive gas stream enters the salt filtration module at the mid-plane via a hardened pipe and impinges on a mechanical flow diverter device that, by gas impingement, redirects gas flow upward and water flow downward. This device is assumed to direct ~10% of the water vapor downward into the collection basin. The upward gas passes through a metallic membrane. On the other side of the membrane is a mixed salt bed with course particles of salt to decrease pressure drop as previously defined. This salt media provides a surface to allow water entrained in the gas to condense and flow via gravity to the water collection basin. The mixed salt bed may be a ternary mixture of sodium pentaborate, salts of cesium, and salts of iodine, although example embodiments are not limited thereto. The radioactive material discharged from the containment is conveyed upward through the salt media by gas pressure. Liquid/vapor entrained in the gas is condensed within the salt media resulting in the salt dissolving, mitigating the diffusion of radioactive materials within the gas. The water/saline solution coalesces/condenses into large enough droplets that will separate and move downward in the structure to the water collection basin. The containment gas exits the top salt filtration section with decontaminated radioactive gas. The DF for each fission product is governed by the theory provided supra.

An additional aspect of the present system relates to salt filtration bed bypass. To prevent the salt bed from bridging and preventing gas flow during repeated use in a severe accident, the membrane may be configured to extend into the salt bed such that bypass is allowed if blockage occurs.

Another aspect of the present system relates to salt media stabilization. Since salts, by chemical properties, are hydrophobic the initial DF is improved by having the salt "activated" (or as dry as possible). The salt is loaded dry via a valve at the top of the device. When fully loaded, the sealing devices are installed at the inlet and outlet. A vacuum is then established in the system via a valve, a vacuum pump, and a vent. This sub-atmospheric establishment allows ease of operation as all that needs to be verified is that the vacuum is still established. The function of this precondition is to provide a dry salt bed to accommodate a large surge of gas initially vented during a severe accident with a large content of radioactivity, such as if the sequence of Fukushima is repeated. This is known as the initial "puff" release that accompanies containment failure. This salt media material will capture radioactive material on the surface as the wet salt begins to dissolve.

Another aspect of the present system relates to a dewatering device. The moisture in the vented gas will condense on the salt material resulting in the dissolution of the solid salt, a phase change, an endothermic reaction and, via polar bonding, the capture of radioactive polar molecules. The saline solution, under the effect of gravity, flows downward in the salt filtration device into the basin with a large surface area to dissipate the resulting decay heat. The saline solution can be conveyed countercurrent to the gas flow or collected in piping (not pictured) that is diverted into the basin. The key to achieving a higher system DF for the nuclear power plant is the removal of radioactive elements (e.g., cesium, iodine) and water in the salt filter.

A further aspect of the present system relates to flange connections/seals. The present system may be used as a salt pre-filter (or post-filter) that is flanged into an existing hardened vent system within the reactor building or outside of the building. The lower liquid basins need to be engineered so that there is enough shielding external to the basin to reduce exposure. The radioactive saline solution is removed via a valve system for either injection back into the reactor core as a neutron absorber (if sodium pentaborate is used) or to a liquid radioactive disposal system.

It should be understood that the present system may be embodied in many different forms and configurations. For instance, the present system may use flow reversals and submerged discharges to remove radioactive materials from the vented gas coupled with a mixed salt bed. As with the non-limiting embodiment previously set forth, various aspects of the above flow reversal and submerged discharge example will be discussed below.

One aspect of the present system relates to deposition. The radioactive gas stream enters the salt filtration module at the mid-plane via a hardened pipe and is diverted downward. The initial vent of the gas stream will impinge on a flow diverter to mechanically redirect the gas water mixture. The redirected gas flow moves upward to the metallic separation membrane. On the other side of the membrane is a mixed salt bed with coarse particles of salt to decrease pressure drop as previously defined. This salt media provides a surface to allow water entrained in the gas to condense and flow via gravity to the water collection basin. The mixed salt bed may be a ternary mixture of sodium pentaborate, salts of cesium, and salts of iodine. The radioactive material discharged from the containment is conveyed upward through the salt media by gas pressure. Liquid/vapor entrained in the gas is condensed within the salt media resulting in the salt dissolving, mitigating the diffusion of radioactive materials within the gas. The water/saline solution coalesces/condenses into large enough droplets that will separate and move downward in the structure to the water collection basin. The gas mixture leaves the salt media and flows through a filter (e.g., sintered metallic filter) to remove large particulates. The gas then undergoes another flow reversal and is conveyed out of the salt filter via a hardened pipe. The DF for each fission product is governed by the theory provided supra.

An additional aspect of the present system relates to submerged gas injection. If a lot of water is vented from the containment, it will condense/dissolve in the salt bed and the resulting saline solution will reside in the basin. As this level increases, it will cover the outlet discharge pipe. The downward discharge of the steam into the saline solution will help in the removal of the radioactive constituents similar to the process in a BWR pressure suppression pool or wetwell. The differential pressure of the entire salt filter remains relatively constant as the additional hydrostatic head is compensated by a decrease in salt media differential pressure.

Another aspect of the present system relates to salt media stabilization. Since salts, by chemical properties, are hydrophobic, the initial DF is improved by having the salt "activated" (or as dry as possible). The salt is loaded dry via a valve at the top of the device. When fully loaded, the sealing devices are installed at the inlet and outlet. Then a vacuum is established in the system via a valve, a vacuum pump, and a vent. This sub-atmospheric establishment allows ease of operation as all that needs to be verified is that the vacuum is still established. The function of this precondition is to provide a dry salt bed to accommodate a large surge of gas initially vented during a severe accident with a large content of radioactivity (if the sequence of Fukushima is repeated). This salt media material will capture radioactive material on the surface as the wet salt begins to dissolve.

Another aspect of the present system relates to a dewatering device. The moisture in the vented gas will condense on the salt material, resulting in the dissolution of the solid salt, a phase change, endothermic reaction, and polar bonding, thereby also resulting in the capture of radioactive polar molecules. The saline solution, under the effect of gravity, flows downward in the salt filtration device into the basin, which has a large surface area to dissipate the resulting decay heat. The saline solution can be conveyed countercurrent to the gas flow out, collected in piping (not pictured) that is diverted into the basin. The key to achieving a higher system DF for the nuclear power plant is the removal of radioactive elements (e.g., cesium, iodine) and water in the salt filter.

A further aspect of the present system relates to flange connections/seals. The present system may be used as a salt pre-filter (or post-filter) that is flanged into an existing hardened vent system within the reactor building or outside of the building. The lower liquid basins need to be engineered so that there is enough shielding external to the basin to reduce exposure. The radioactive saline solution is removed via a valve system for either injection back into the reactor core as a neutron absorber (if sodium pentaborate is used) or to a liquid radioactive disposal system.

Those skilled in the art will realize there are complex chemical reactions, heat transfer mechanisms, and mass transfer mechanisms to accomplish radioactive filtering. In mathematical terms, the gas enters the salt filter with two basic components: mass flow rate ($\dot{m}$) and heat flow rate ($Q''$). The mass flow rate in ($\dot{m}_{vent}$ or $\dot{m}_v$) is composed of gas ($\dot{m}_{gas}$), water ($\dot{m}_{H_2O}$), and fission products ($\dot{m}_{pp}$). The mass flow rate out ($m_o$) may be similarly defined. The goal of the salt filtration system is to have a high Decontamination Factor (DF). As the water laden gas flows through the salt bed, condensation, dissolution, and adsorption occurs. The mass of the filter then is a function of gas temperature and is defined as $m_{filter}$, comprised of mass of the salt $m_{salt}$ draining to the catch basin plus the mass of water $m_{H_2O}$ in the saline solution and the mass of the fission products captured $m_{FP}$. The end result of the salt filter is represented by the heat balance equation, $Q_v''=Q_{out}''+Q_{filter}''$. The goal is to have the heat capture rate in the filter ($Q''_{Filter}$) be substantially larger than the heat flow rate leaving the filter ($Q''_{out}$). $Q_v''$ is the heat flow rate in.

The present approach may be better appreciated when three different filter media (marbles, sodium chloride, and mixed salt bed) are utilized in connection with two hypothetical plant states, Beginning of Accident (BOA) and End of Accident (EOA). This comparison will help highlight the advantages of the present salt media filter through the basic modes of operation of the in situ pipe radioactive capture system.

The use of marbles as an example of conventional filter media is intended to help conceptualize the condensation of hot radioactive water-laden containment gas into a media bed. The glass surface area of the marbles will allow a surface for condensation of the water vapor. However, this condensation will decrease as a function of time (assuming continued venting) due to the thermal equilibrium being established between the gas and marbles (the marbles get hot). Thus, initial water vapor is formed and moves downward into the catch basins. The capture of radioactive elements (e.g., cesium and iodine) is therefore poor ($m_v \approx m_o$), and the heat in ($Q_v$) and heat out ($Q_o$) are about the same.

The use of sodium chloride as an example of filter media is used to help conceptualize the function of a salt. During an accident, the hot radioactive water-laden containment gas enters in the salt bed. The surface area of the salt acts as surface for condensation of the radioactive water vapor. During the condensation, radioactive targets (e.g., cesium and iodine salts with polar affinity) are captured. The media bed is mitigated in heat up as the dissolution of the salt is endothermic and the saline solution moves downward adding to heat transfer from the gas to the saline solution. As a result, $Q_o < Q_v$, and $m_o < m_v$, which is an improvement from the above marble example.

The present approach uses a mixed salt bed. It is advantageous for the mixed salt bed to include a salt such as sodium pentaborate, which has a relatively large swing in solubility as a function of temperature. Table 5 below compares the solubility of NaCl and $Na_2B_{10}O_{16}$ at two temperatures.

TABLE 5

| Salt | Cold (20° C.) | Hot (80° C.) |
| --- | --- | --- |
| NaCl | 35 g/100 cc | 39 g/100 cc |
| $Na_2B_{10}O_{16}$ | 2 g/100 cc | 170 g/100 cc |

In a non-limiting embodiment, the bulk of the bed is composed of sodium pentaborate with, for example, salts of cesium and iodine added in to enhance the selective capture of cesium and iodine via polar bonding and dissolution in the water. This mixed salt bed allows its performance to be adjusted based on the temperature of the vented gas. In particular, if early venting occurs during a severe accident, then the gas temperature is lower. As a result, not as much salt is dissolved in the capture of water vapor, which allows the salt media to be available if accident conditions worsen and still act as an effective filter media. On the other extreme, if venting is delayed for whatever reason (similar to Fukushima), then in initial venting of a very hot saturated radioactive gas, the salt media responds with more dissolution of the salt media to remove heat and better capture the radioactive elements such as cesium and iodine (in general, the hotter the gas, the harder it is to capture radioactive elements such as cesium and iodine due to thermophoretic dispersion). As a result of salt dissolution in the present method, $Q_o \ll Q_v$ and $m_o \ll m_v$, which is an improvement over the above marble and sodium chloride examples. Thus, a mixed salt bed will have better performance at Beginning of Accident (BOA) regardless of the inlet temperature and will also have better performance at End of Accident (EOA).

As previously noted, the present system may be used as a pre-filter, a post-filter, or as a standalone filter. Regarding the operation of present system as a filter having a salt bed, there are three modes: passive standby, active use, and post-event radionuclide recovery. Each mode is explained below.

As noted above, the first mode is passive standby. In particular, after installation of the filter, salt is added, and the system is sealed, either in a sub-atmospheric condition or inerted with argon at elevated pressure. Either gas pressure state provides the plant operator an easy method to know if the system is ready for operation in the passive standby mode. Thus, in the "no flow condition," the mixed salt bed media retains its necessary original chemical and physical form.

The second mode is active use. During a severe accident or other off-normal event in which containment venting is required, gas flow is directed into the salt filtration filter. This will cause system pressure to increase and create gas flow through and out of the filter.

The third mode is radionuclide recovery and plant Decontamination & Decommissioning (D&D). When the nuclear power plant reaches stability (which is expected to be measured in months after a severe accident), the task of nuclear power plant facility cleanup and decommissioning begin. The filtered vent system is sealed. The drain valve is opened for removal of the radioactive brine solution for cleanup. This method has two major steps: removal of the bulk contaminants from the coolant, and the generation of safe, secure, and stable high-level waste forms for permanent geologic disposal. An alumina and a humate bed may be used. This method may be completed by attaching temporary piping to the downstream of the drain valve.

As discussed herein, the present disclosure introduces a method for onsite capture of radioactive material released from the containment vessel that originated from either the reactor vessel or the spent fuel pool depending on the design of a nuclear power plant.

There is public concern as to the feasibility of achieving minimal off-site release of radioactive material after a Fukushima-like accident. Before the Three Mile Island meltdown, containments did not have hardened containment venting systems. The Fukushima accident demonstrated the consequences of radioactive material release through a hardened containment vent after a severe nuclear accident. Thus, the problem is capturing a large volume of radioactive material (which may take the form of particulates, contaminated water, or gas/aerosol), thereby preventing release to the environment and widespread contamination of habitable land.

The problems and limitations of the conventional art may be overcome by implementing the present salt venting approach (e.g., as a pre-filter or post-filter) with an existing system. Alternately, the present system may be implemented as a separate standalone system.

As previously noted, FIG. 1 is a schematic view of a salt filtration system according to an example embodiment of the present disclosure. Referring to FIG. 1, the salt filtration system 100 includes a module body 102 that defines a chamber 104 therein. The module body 102 includes an inlet 106 to the chamber 104 and an outlet 108 therefrom. A porous membrane 110 is disposed within the module body 102. The porous membrane 110 is between the inlet 106 and the outlet 108 of the module body 102. The porous membrane 110 divides the chamber 104 into an upper section and a lower section. A bed of salt 112 is supported by the porous membrane 110 so as to be within the upper section of the chamber 104. The salt 112 constitutes more than 50 percent by weight of the bed of filter media. In a non-limiting embodiment, the salt 112 constitutes more than 90 percent by weight of the bed of filter media. In particular, the bed of filter media may consist essentially of the salt 112.

The inlet 106 to the chamber 104 is below the outlet 108 therefrom. The inlet 106 to the chamber 104 is also on a side portion of the module body 102. The inlet 106 to the chamber 104 is configured to direct a gas flow toward an inner side surface of the module body 102. However, it should be understood that the inlet 106 is not limited to that shown in the drawings. In particular, the gas flow can enter the chamber 104 from any direction (via an appropriately configured inlet 106) as long as the gas flow will impinge on a surface that will facilitate in drawing out the water from the gas. The outlet 108 from the chamber 104 is shown as being on a top portion of the module body 102. However, it should be understood that the outlet 108 is not limited thereto.

The porous membrane 110 is above the inlet 106 to the chamber 104 and below the outlet 108 therefrom. The porous membrane 110 includes a plurality of pores. The plurality of pores of the porous membrane 110 is of a size that restricts passage of particles of the salt 112 through the porous membrane 110 while permitting passage of a solution of the salt 112 therethrough. The porous membrane 110 is angled inward toward a center of the module body 102. The salt 112 has a solubility in water that spans at least a 100 g/100 cc range over a 60 degree Celsius temperature difference. In a non-limiting embodiment, the salt 112 has a solubility in water that spans at least a 150 g/100 cc range over a 60 degree Celsius temperature difference. For instance, $Na_2B_{10}O_{16}$ (which may be included in the bed of salt 112) has a solubility of 2 g/100 cc of water at 20° C. and a solubility of 170 g/100 cc of water at 80° C.

A flow diverter 114 is on an inner surface of the module body 102. The flow diverter 114 is aligned with the inlet 106 to the chamber 104. As shown in FIG. 1, when the inlet 106 is provided through a sidewall of the module body 102, the flow diverter 114 is disposed on an opposing inner surface of the module body 102 in order to divert the gas impinging thereon.

FIG. 2 is a schematic view of a salt filtration system according to another example embodiment of the present disclosure. The features of FIG. 2 that correspond to the features of FIG. 1 may be as previously discussed. Referring to FIG. 2, the salt filtration system 200 includes a module body 202 that defines a chamber 204 therein. The module body 202 includes an inlet 206 to the chamber 204 and an outlet 208 therefrom. A porous membrane 210 is disposed within the module body 202. The porous membrane 210 is between the inlet 206 and the outlet 208 of the module body 202. The porous membrane 210 divides the chamber 204 into an upper section and a lower section. A bed of salt 212 is supported by the porous membrane 210 so as to be within the upper section of the chamber 204. The salt 212 constitutes more than 50 percent by weight of the bed of filter media.

The inlet 206 to the chamber 204 is configured to direct a gas flow toward an inner bottom surface of the module body 202. A flow diverter 214 is disposed on an inner bottom surface of the module body 202 so as to be aligned with the inlet 206 to divert the gas impinging thereon. Thus, the salt filtration system 200 is configured such that the gas undergoes a first flow reversal prior to contacting the bed of salt 212. It should be understood that the inlet 206 is not limited to that shown in the drawings. In particular, the gas flow can enter the chamber 204 from any direction (via an appropriately configured inlet 206) as long as the gas flow will impinge on a surface that will facilitate in drawing out the water from the gas.

The outlet 208 from the chamber 204 is on a side portion of the module body 202. In particular, the salt filtration system 200 is configured such that the salt-filtered gas undergoes a second flow reversal after passing through the bed of salt 212 and prior to entering the pipe that leads to the outlet 208. However, it should be understood that the outlet 208 is not limited thereto.

Although the salt filtration system 100 of FIG. 1 is shown as being configured differently from the salt filtration system 200 of FIG. 2, it should be understood that the features and configurations of one may be adopted in the other. For instance, the module body 102 of FIG. 1 may be configured like the module body 202 of FIG. 2 (and vice versa). Additionally, the inlet 106 of FIG. 1 may be configured like the inlet 206 of FIG. 2 (and vice versa) so as to provide a submerged gas stream when the liquid level in the module body 102 rises during venting. The porous membrane 110 of FIG. 1 may also be configured like the porous membrane 210 of FIG. 2 (and vice versa). Furthermore, the outlet 108 of FIG. 1 may be configured like the outlet 208 of FIG. 2 (and vice versa). However, it should be understood that the above examples of suitable modifications are not meant to be exhaustive. In the interest of furthering the present salt filtration approach, various changes and alternatives are possible without undermining the teachings herein.

A method of removing a radioactive material from a gas (e.g., severe accident containment venting) is discussed below in connection with FIG. 1. Referring to FIG. 1, a method of removing a radioactive material from a gas includes directing the gas through a bed of salt 112. The directing step may include a venting of the gas from a reactor containment during an accident at a nuclear plant. The gas includes water vapor and the radioactive material. The salt 112 constitutes more than 50 percent by weight of the bed. The method additionally includes condensing the water vapor in the bed and dissolving a portion of the salt 112 to form a salt solution. The method further includes absorbing the radioactive material into the salt solution while a remainder of the gas passes through the bed and exits through the outlet 108. The salt solution flows downward via gravity and accumulates at the bottom of the module body 102.

The salt 112 includes sodium pentaborate. In a non-limiting embodiment, the salt 112 may consist essentially of sodium pentaborate. Alternatively, the salt 112 may be a mixture of several types of salt, one of which is sodium pentaborate. When the salt 112 is in the form of a mixture, at least 50 percent by weight of the mixture is sodium pentaborate. The radioactive material and the salt 112 include an element in common. In particular, the removal of a radioactive element from a vented containment gas may be facilitated by including a salt of that radioactive element in the mixed bed of salt 112. That being said, the salt 112 may further include at least one of a cesium salt and an iodine salt when the radioactive material targeted for removal is at least one of cesium and iodine.

The dissolving of the salt 112 involves an endothermic reaction. In particular, the heat of solution of the endothermic reaction is provided by the gas such that a temperature of the gas is lowered by the endothermic reaction. The absorbing step includes capturing the radioactive material via polar bonding. With the present method, a decontamination factor of at least 100 may be obtained.

A method of removing a radioactive material from a gas in connection with FIG. 2 similar to the method in connection with FIG. 1 on a fundamental level. That being said, the common concepts between FIG. 2 and FIG. 1 will not be repeated in the interest of brevity. Notably, the method in connection with FIG. 2 differs from the method in connection with FIG. 1 in that the gas is subjected to a first flow reversal (via the configuration of the inlet 206 and the flow diverter 214) and a second flow reversal (via the configuration of the outlet 208).

While a number of example embodiments have been disclosed herein, it should be understood that other variations may be possible. Such variations are not to be regarded as a departure from the spirit and scope of the present disclosure, and all such modifications as would be obvious to one skilled in the art are intended to be included within the scope of the following claims.

The invention claimed is:

1. A method of removing a radioactive material from a gas, comprising:
   directing the gas through a bed of salt, the gas including water vapor and the radioactive material, the salt constituting more than 50 percent by weight of the bed, the salt including sodium pentaborate;
   condensing the water vapor in the bed and dissolving a portion of the salt to form a salt solution; and
   absorbing the radioactive material into the salt solution while a remainder of the gas passes through the bed.

2. The method of claim 1, wherein the directing includes a venting of the gas from a reactor containment during an accident at a nuclear plant.

3. The method of claim 1, wherein the radioactive material and the salt include an element in common.

4. The method of claim 1, wherein the salt further includes at least one of a cesium salt and an iodine salt.

5. The method of claim 1, wherein the salt includes at least 50 percent by weight of the sodium pentaborate.

6. The method of claim 1, wherein the radioactive material is at least one of cesium and iodine.

7. The method of claim 1, wherein the dissolving involves an endothermic reaction, a heat of solution of the endothermic reaction being provided by the gas such that a temperature of the gas is lowered by the endothermic reaction.

8. The method of claim 1, wherein the absorbing includes capturing the radioactive material via polar bonding.

9. The method of claim 1, wherein the decontamination factor is at least 100.

\* \* \* \* \*